March 11, 1930. A. L. BILLENWILLMS 1,750,564
TUBING LINE ATTACHMENT
Filed Dec. 10, 1928
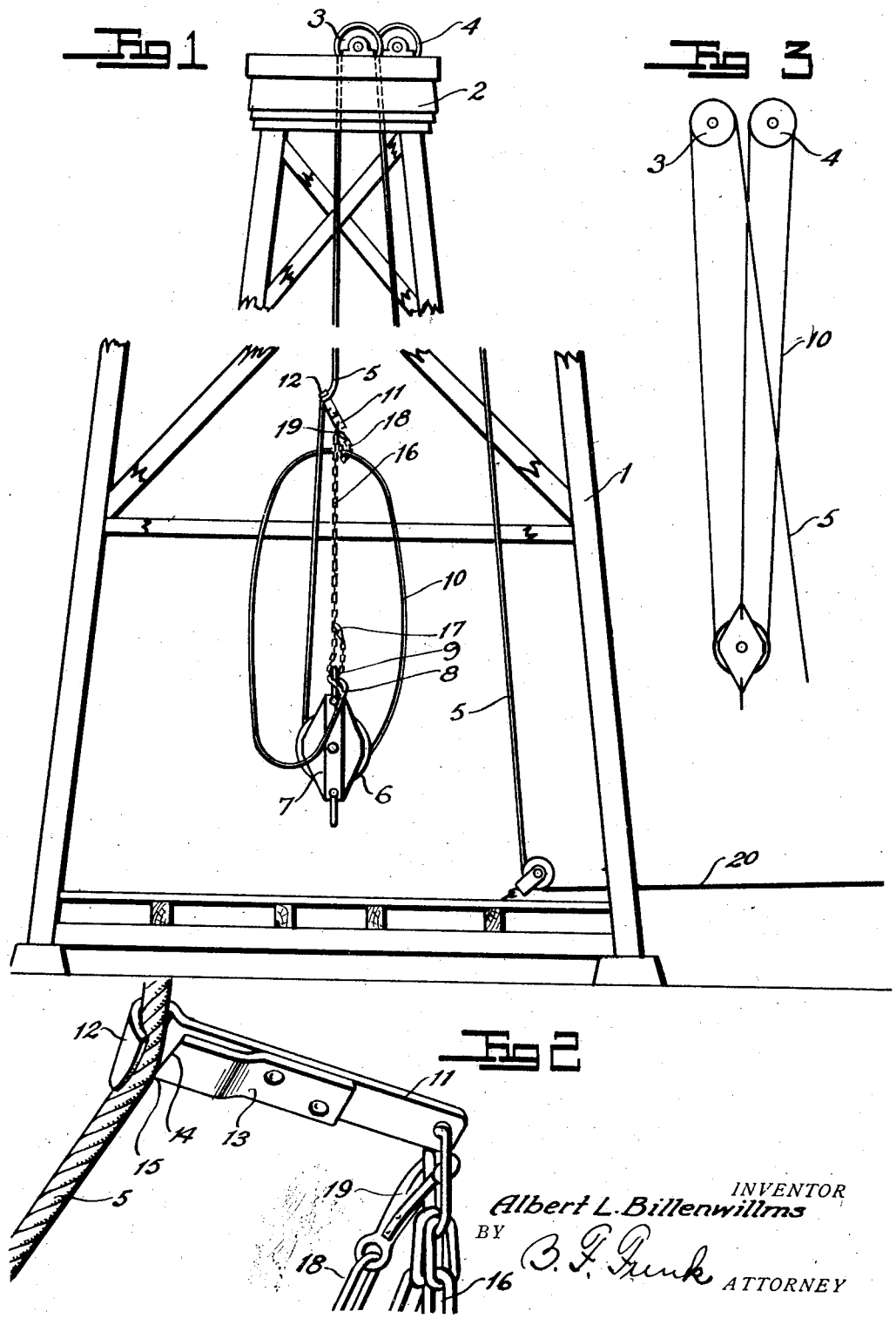
INVENTOR
Albert L. Billenwillms
BY
C. F. Frunk, ATTORNEY Patented Mar. 11, 1930

1,750,564

UNITED STATES PATENT OFFICE

ALBERT L. BILLENWILLMS, OF AUGUSTA, KANSAS

TUBING-LINE ATTACHMENT

Application filed December 10, 1928. Serial No. 325,112.

This invention relates to a line tie chain for lines or cables of well drilling rigs and the primary object is to provide a line tying chain for cables supporting a tubing block or casing block. It will hereinafter be referred to as a "tubing line tie chain" with the understanding that it is susceptible of other uses.

When it is desired to pull tubing, the line from the crown block is passed through a pulley block and over a pulley on the water table of the derrick. Prior to my invention, a bight was made in the line or cable and soft rope was used to tie the bight to the cable so that the bight could be hoisted to the water table to be put over the pulley. Usually two knots had to be tied before raising the block and then the knots had to be untied. This required considerable time especially if the rope was wet. It was particularly disagreeable in cold and wet weather and after the soft rope was used a few times, it was liable to pull out or break with resultant danger to persons on the derrick floor. I have obviated the danger and have facilitated the operation by utilizing a line engaging device which may be attached to the line by slightly kinking it, the line engaging or kinking device having a chain or flexible connection which may be secured to the clevis in the block and another flexible connection which may secure the top of the bight of the line to the line engaging device so that the bight and the block may be raised to the top of the derrick. Then, by releasing the flexible connections from the block and the bight and removing the line engaging device, the tie chain can be taken off.

The novelty of the invention will be understood by reference to the following description in connection with the accompanying drawings in which:

Fig. 1 is a fragmentary elevational view of a conventional form of derrick and a line or cable to which my invention is applied.

Fig. 2 is a perspective view of the line engaging device, part of the line and part of the flexible connection and Fig. 3 is a diagrammatical view of the line and block in place.

The derrick 1 may be of conventional construction provided with the usual water table 2 and the crown block pulleys 3 and 4, the line 5 passing over the pulley 3 in the usual way. When it is desired to pull tubing or casing, the line 5 is passed through the sheave 6 of the block 7, the end having a loop 8 in the clevis 9 of the block so that a bight or loop 10 is formed which is adapted to be raised to pass over the pulley 4. In order to keep the bight in proper shape, that is, have its upper end elevated and to support the block from the cable or line depending from the pulley 3, I provide the tubing line tie chain. This consists of a bar 11 having a flat hook-shaped jaw 12 to engage the line 5 and a gripping bar 13 fast to the bar 11, the inner end edge 14 of which is cut on an angle to form a toe 15 to impinge against or bite into the line or cable 5 as clearly seen in Figure 2.

Depending from the end of the bar 11 is a flexible connection shown as a chain 16 having at the lower end a snap hook 17 so that the end of the chain 16 can be passed through the clevis of the block 7 and the hook 17 snapped into one of the links of the chain so that the block is supported or suspended from the cable or line 5 by the chain or flexible chain 16. There is a second flexible connection 18 preferably in the form of a chain with a snap hook 19 at its end which may pass around the upper portion of the bight 10, the hook 19 being snapped into one of the links of the chain 16 as clearly shown in Figures 1 and 2. Then power is applied to the portion 20 of the cable or line 5 so that the loop or bight is raised to the top of the derrick and slipped over the pulley 4. Then, the hook 19 is released to slip the bight over the pulley 4, then the slack in the bight is taken up to put slack in the chain, then the hook 17 and the cable engaging device or bar 11 are removed from the line, it being understood that the space between the flat hook-shaped jaw 12 and toe of the bar 13 is at least equal to the diameter of the line or cable 5 and the forward portion 14 of the bar 13 is offset with respect to the bar 11 so that its toe 15 can impinge against or bite into the center of the line or cable 5.

From the foregoing it will be apparent that the line tie chain can be easily attached to and detached from the cable and block whenever occasion demands.

What I claim and desire to secure by Letters Patent is:—

1. A line tie chain for oil well rigs comprising an elongated cable engaging bar, a flexible connection suspended from one end of the bar having pulley block engaging means and a flexible connection connected to the bar for engaging a bight in the line.

2. A line tie chain for oil well rigs comprising an elongated cable engaging bar, a flexible connection suspended from one end of the bar having pulley block engaging means and a flexible connection connected to the bar for engaging a bight in the line, the bar having a flat hook-shaped cable engaging end.

3. A line tie chain for oil well rigs comprising an elongated cable engaging bar, a flexible connection suspended from one end of the bar having pulley block engaging means, a flexible connection connected to the bar for engaging a bight in the line, the bar having a flat hook-shaped cable engaging end and a bar carried by the first named bar having a cable engaging toe.

4. A line tie chain for oil well rigs comprising an elongated cable engaging bar, a flexible connection suspended from one end of the bar having pulley block engaging means, a flexible connection connected to the bar for engaging a bight in the line, the bar having a flat hook-shaped cable engaging end and a bar carried by the first named bar having a cable engaging toe, the toe on the second bar being offset with respect to the first named bar.

5. A line tie chain comprising an elongated bar having a hook-shaped end to engage a cable or line, a second bar fast to the first having a line or cable engaging end spaced from the hook-shaped portion, a flexible connection suspended from the end of the bar distant from the hook-shaped portion, a hook on the end of the flexible connection and a bight supporting flexible connection carried by the bar.

6. A line tie chain comprising an elongated bar having a hook-shaped end to engage a cable or line, a second bar fast to the first having a line or cable engaging end spaced from the hook-shaped portion, a flexible connection suspended from the end of the bar distant from the hook-shaped portion, a hook on the end of the flexible connection and a bight supporting flexible connection carried by the bar, the second flexible connection being shorter than the first.

7. A line support for lines or cables of oil well rigs comprising a line engaging member, means carried on the member for suspending a pulley block therefrom and means carried by the member for supporting the upper end of a bight formed in the line.

In testimony whereof I affix my signature.

ALBERT L. BILLENWILLMS.